US012791300B2

(12) United States Patent
Hariyama et al.

(10) Patent No.: US 12,791,300 B2
(45) Date of Patent: Nov. 10, 2026

(54) DISTANCE MEASURING DEVICE AND DISTANCE MEASURING METHOD

(71) Applicant: Hitachi High-Tech Corporation, Tokyo (JP)

(72) Inventors: Tatsuo Hariyama, Tokyo (JP); Masahiro Watanabe, Tokyo (JP); Kenji Maruno, Tokyo (JP); Hirohito Akiyama, Tokyo (JP); Hidehiko Kando, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 65 days.

(21) Appl. No.: 18/872,878

(22) PCT Filed: May 24, 2023

(86) PCT No.: PCT/JP2023/019326
§ 371 (c)(1),
(2) Date: Dec. 9, 2024

(87) PCT Pub. No.: WO2024/024242
PCT Pub. Date: Feb. 1, 2024

(65) Prior Publication Data
US 2026/0036416 A1 Feb. 5, 2026

(30) Foreign Application Priority Data
Jul. 29, 2022 (JP) ................................ 2022-121995

(51) Int. Cl.
*G01B 9/02015* (2022.01)
*G01B 9/02* (2022.01)
(Continued)

(52) U.S. Cl.
CPC ....... *G01B 9/02025* (2013.01); *G01B 9/0205* (2013.01); *G01B 9/02067* (2013.01); *G01B 11/002* (2013.01); *G01B 11/026* (2013.01)

(58) Field of Classification Search
CPC ................................ G01B 11/24; G01B 11/26
See application file for complete search history.

(56) References Cited

U.S. PATENT DOCUMENTS 9,581,556 B1 * 2/2017 Segall .................. G01N 21/954
2020/0018823 A1 1/2020 Maruno et al.
(Continued)

FOREIGN PATENT DOCUMENTS

JP 9-318879 A 12/1997
JP 2002-257706 A 9/2002
(Continued)

OTHER PUBLICATIONS

International Search Report (PCT/ISA/210) issued in PCT Application No. PCT/JP2023/019326 dated Jul. 18, 2023 with English translation (5 pages).
(Continued)

*Primary Examiner* — Thanh Luu
(74) *Attorney, Agent, or Firm* — Crowell & Moring LLP

(57) ABSTRACT

A distance measuring device measures a distance to a target object with high accuracy by reducing stray light in a probe tip end section.

In the distance measuring device, the probe tip end section has an optical path switching element that switches an optical path of measurement light incident from the optical element, at a tip end of the probe tip end section. A material of at least a part of the probe tip end section provided at a position opposite to a fifth surface absorbs the measurement light.

8 Claims, 18 Drawing Sheets

(51) Int. Cl.
*G01B 9/02055* (2022.01)
*G01B 11/00* (2006.01)
*G01B 11/02* (2006.01)

(56) References Cited

U.S. PATENT DOCUMENTS

2020/0041259 A1* 2/2020 Watanabe ............. G01S 7/4818
2020/0173854 A1* 6/2020 Munro .................. G01J 3/0205

FOREIGN PATENT DOCUMENTS

JP 2020-8496 A 1/2020
JP 6730483 B2 7/2020

OTHER PUBLICATIONS

Japanese-language Written Opinion (PCT/ISA/237) issued in PCT Application No. PCT/JP2023/019326 dated Jul. 18, 2023 with English translation (7 pages).

* cited by examiner

[FIG. 1]
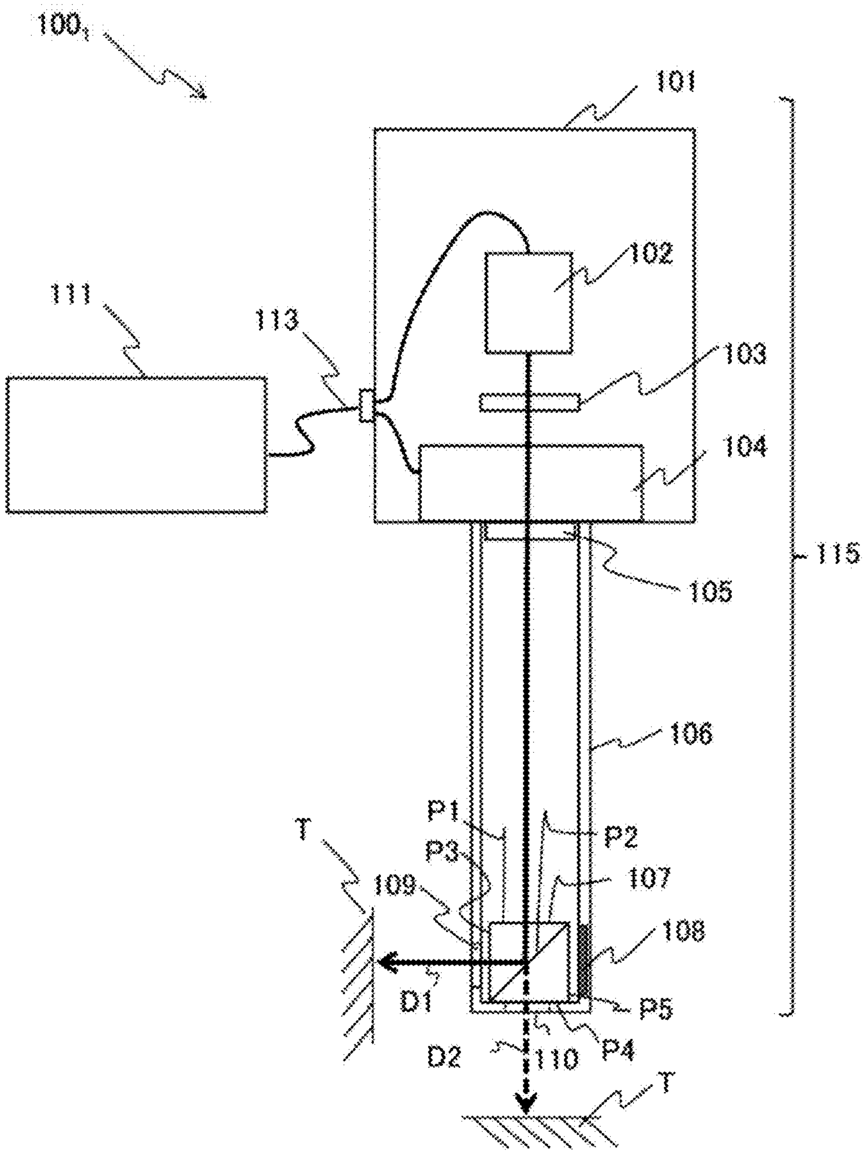

[FIG. 2]
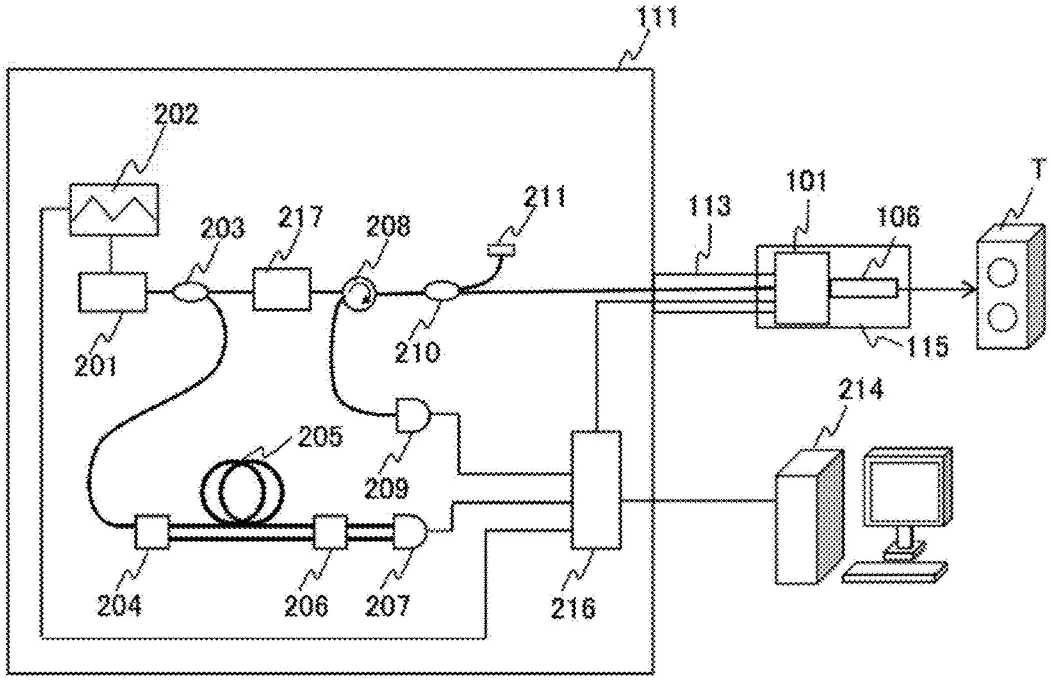
[FIG. 3]
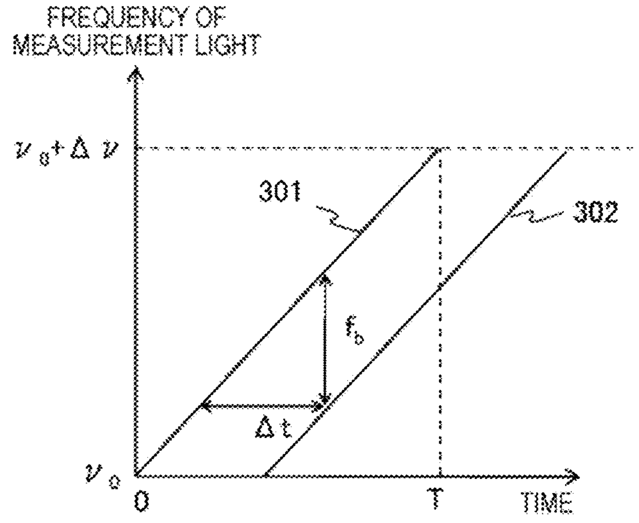

[FIG. 4]
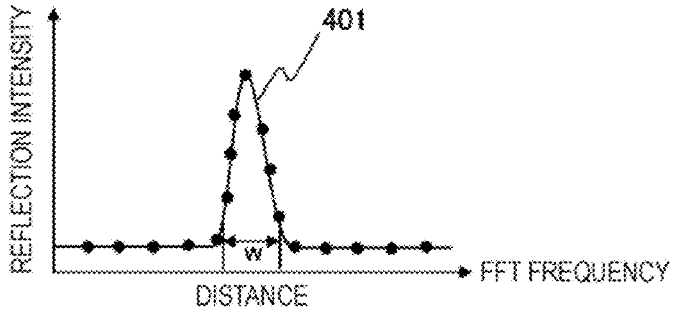
[FIG. 5]
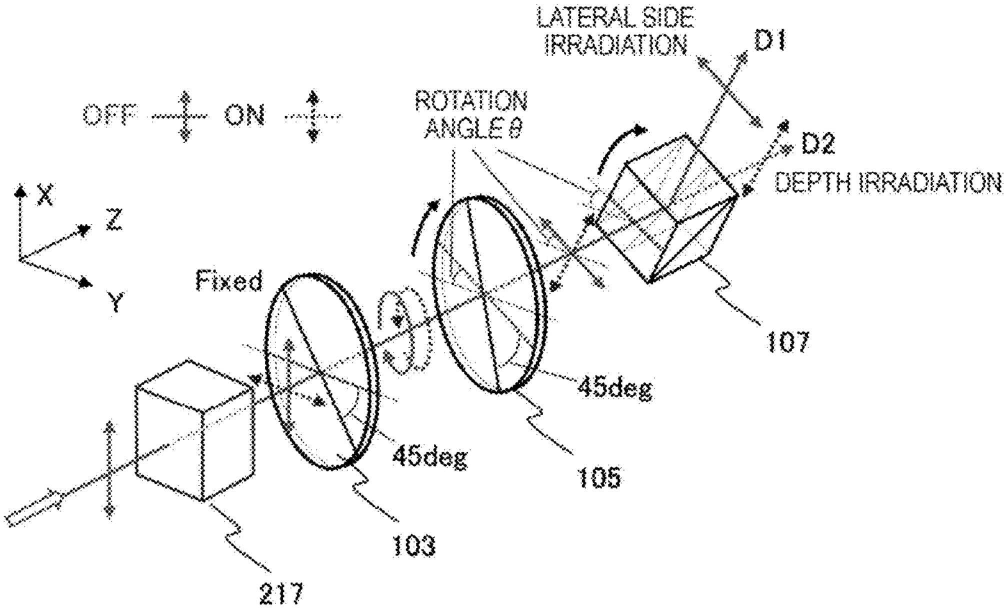

[FIG. 7]
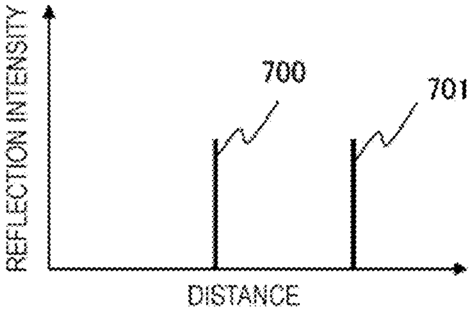
[FIG. 8]
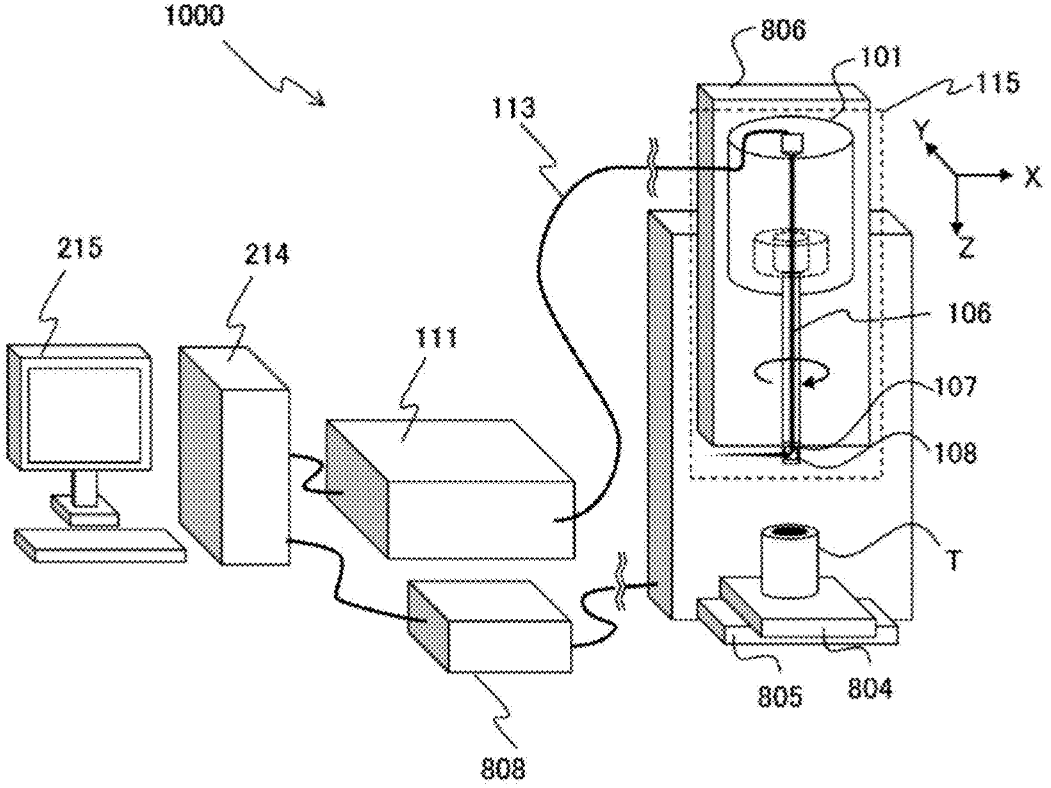

[FIG. 9]
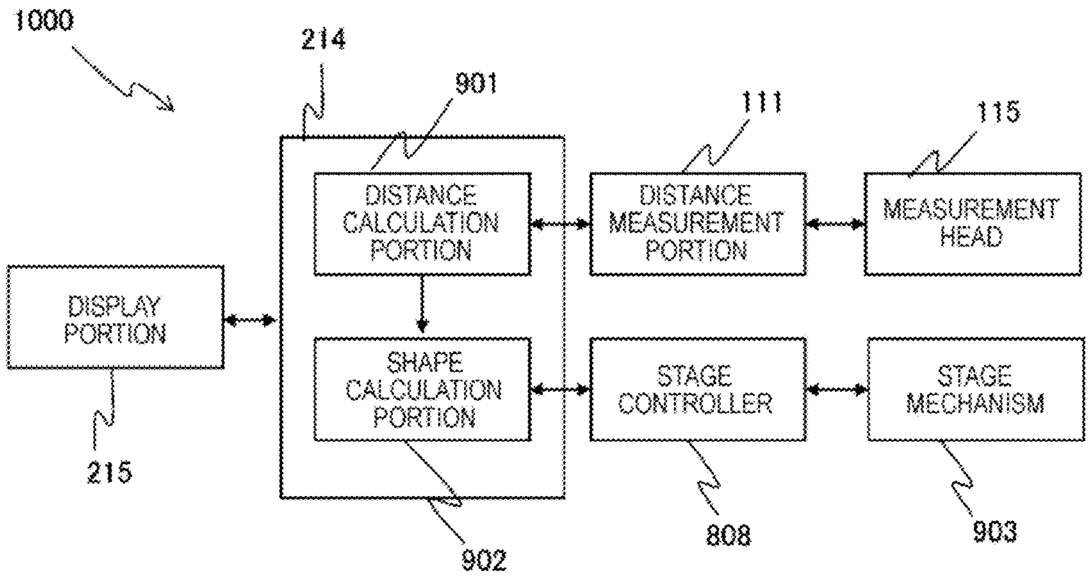

[FIG. 10]
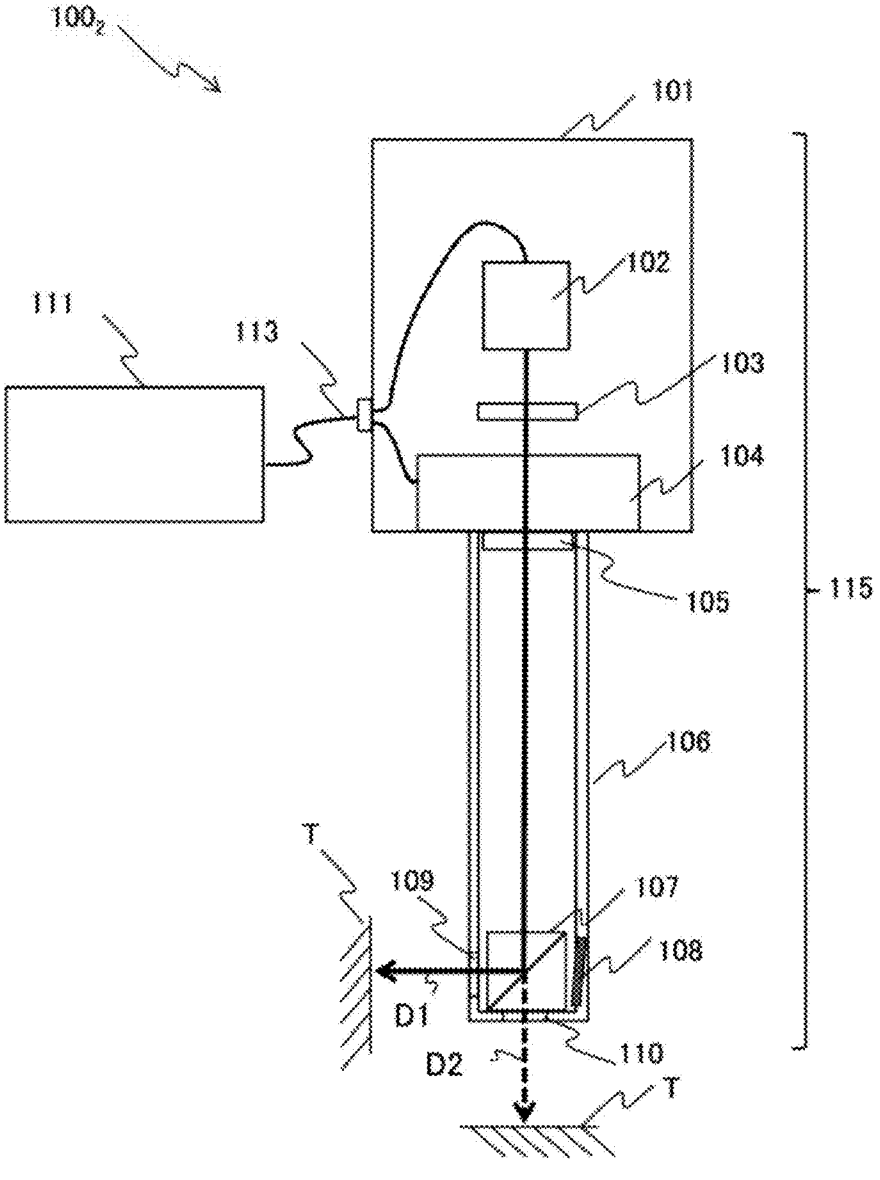

[FIG. 11]
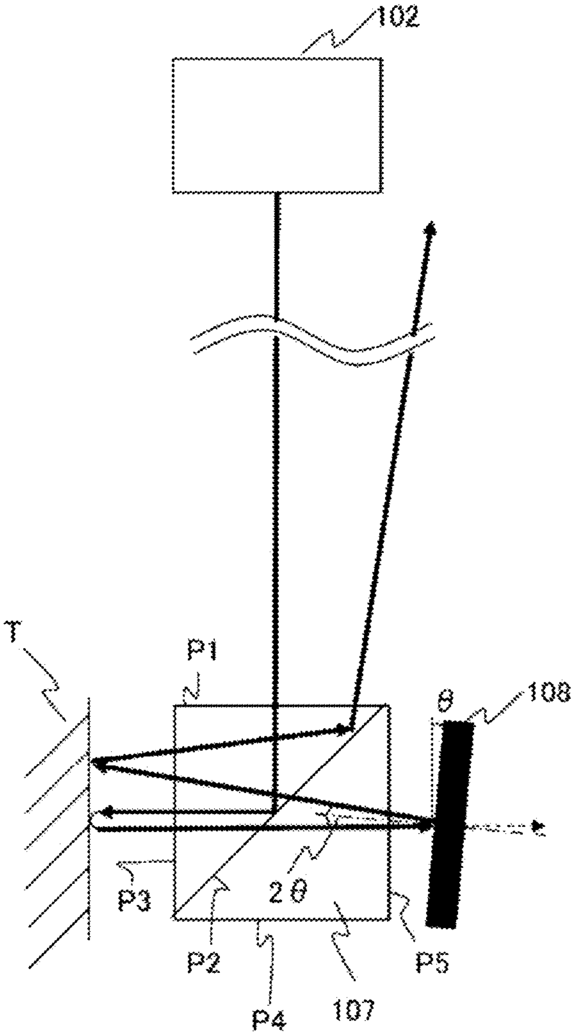

[FIG. 12]
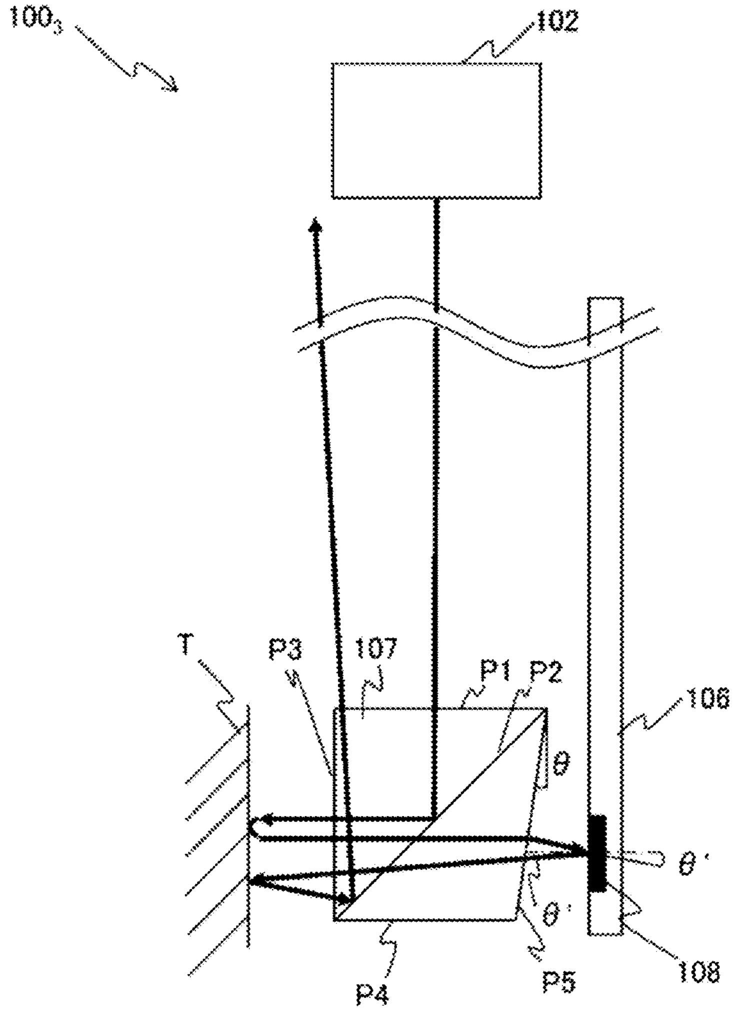

[FIG. 13]
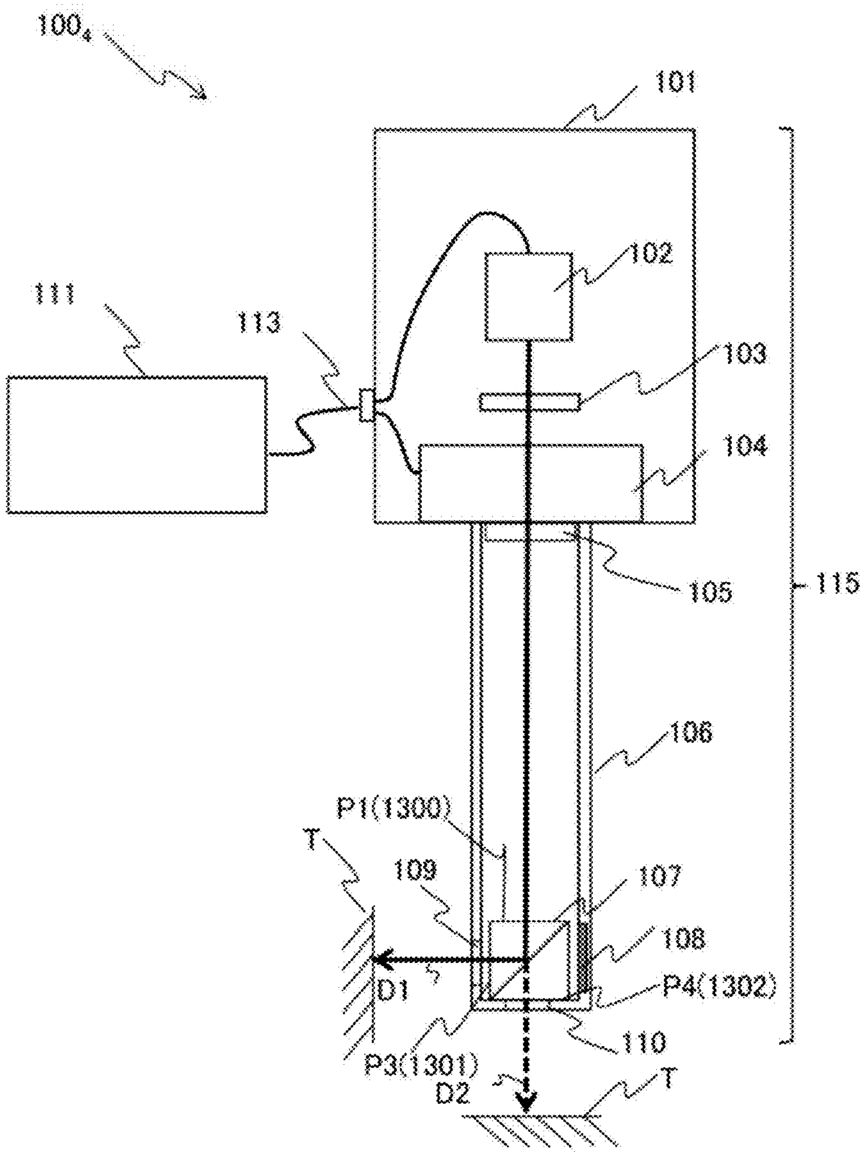

[FIG. 14]
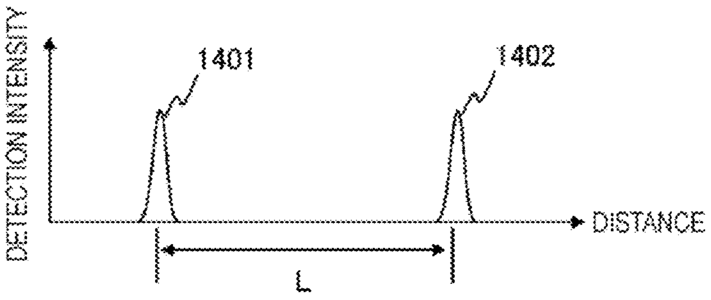

[FIG. 15]
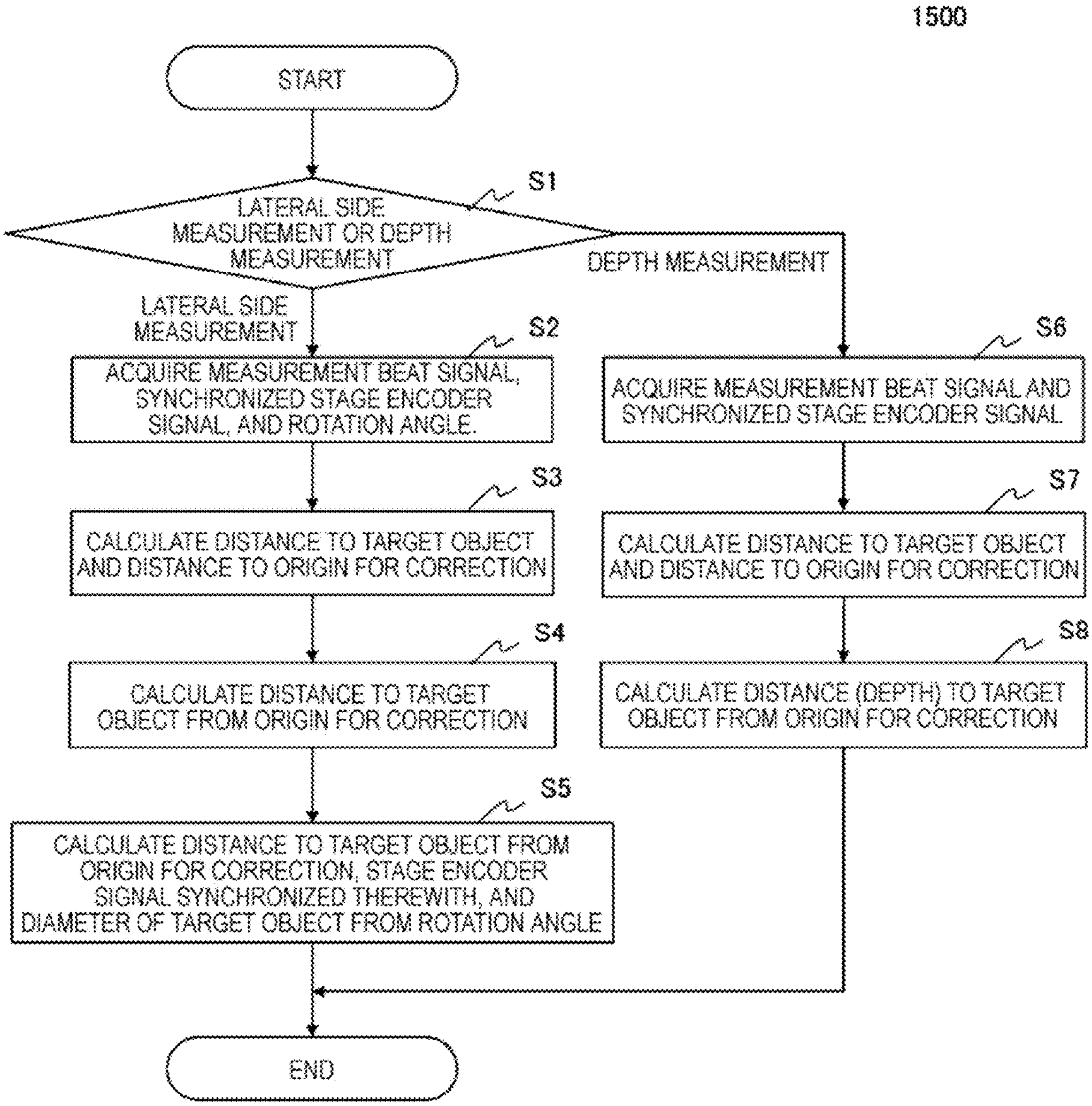

[FIG. 16]
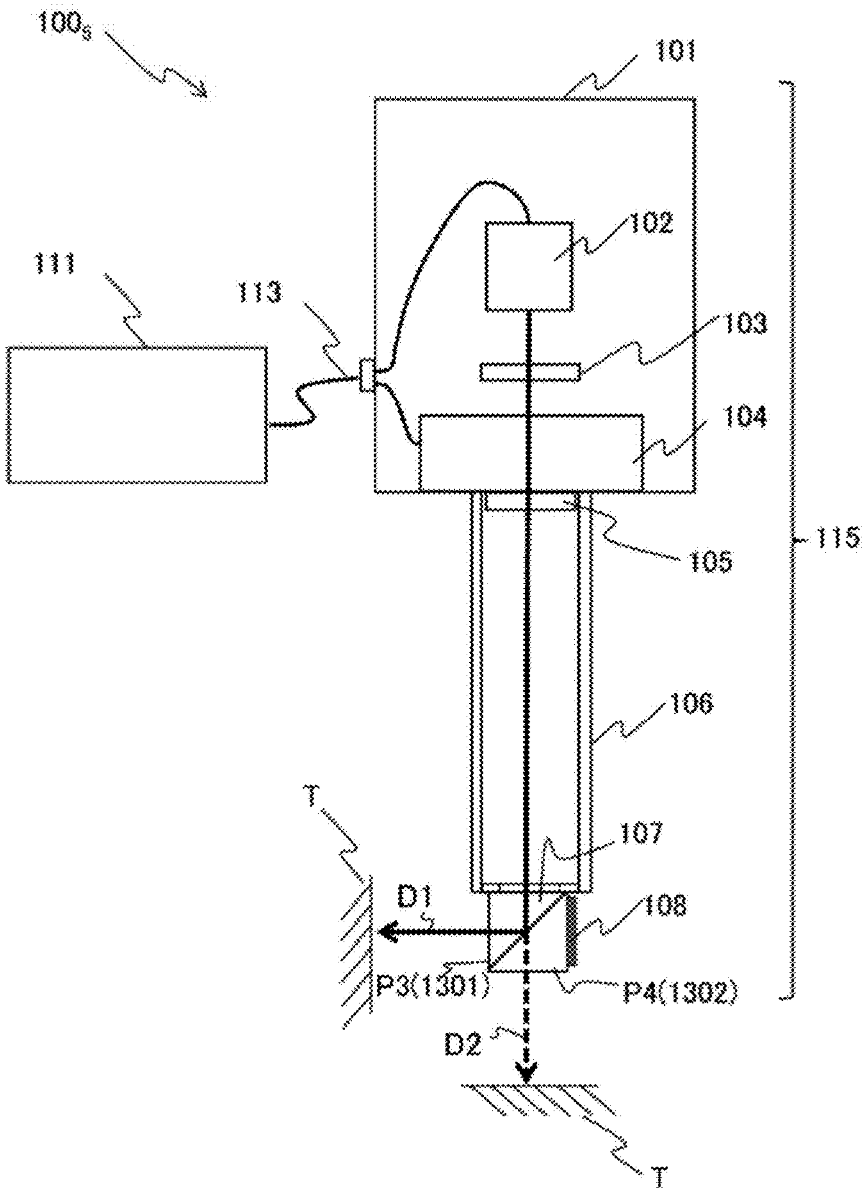

[FIG. 17]
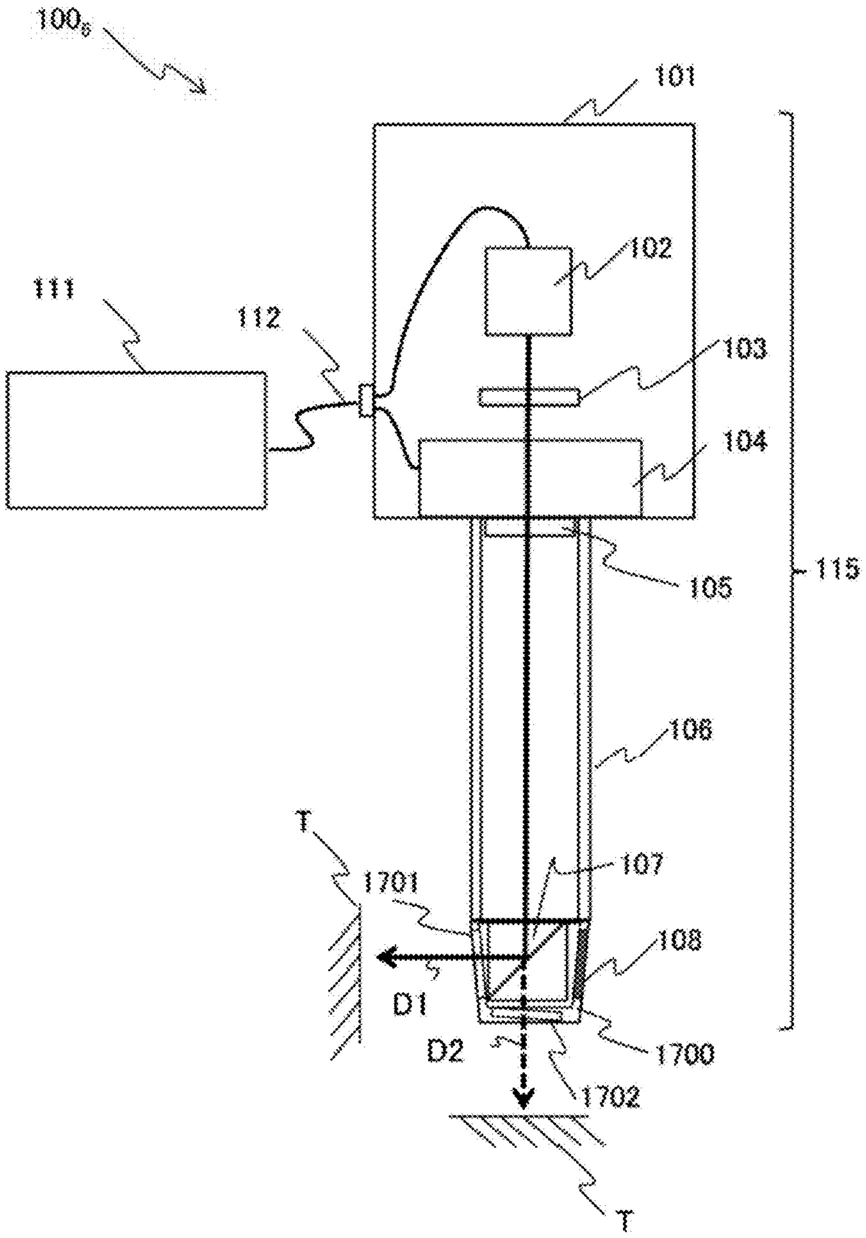

[FIG. 18]
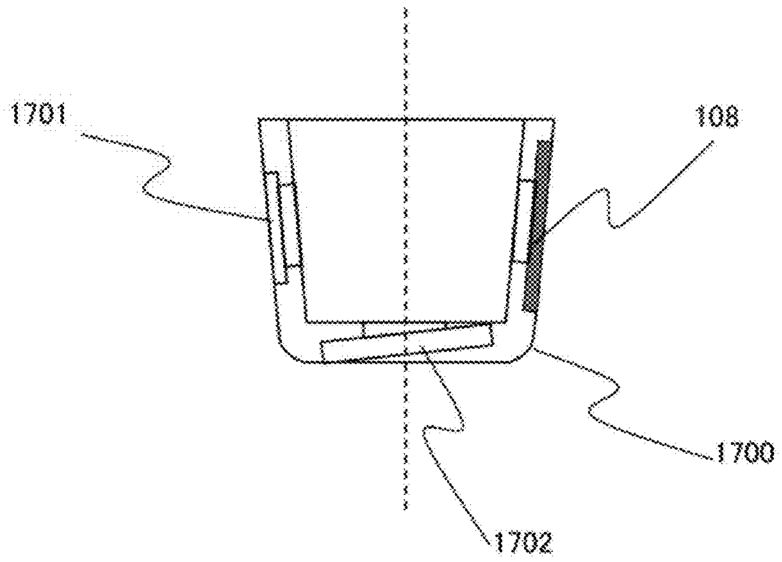

[FIG. 19]
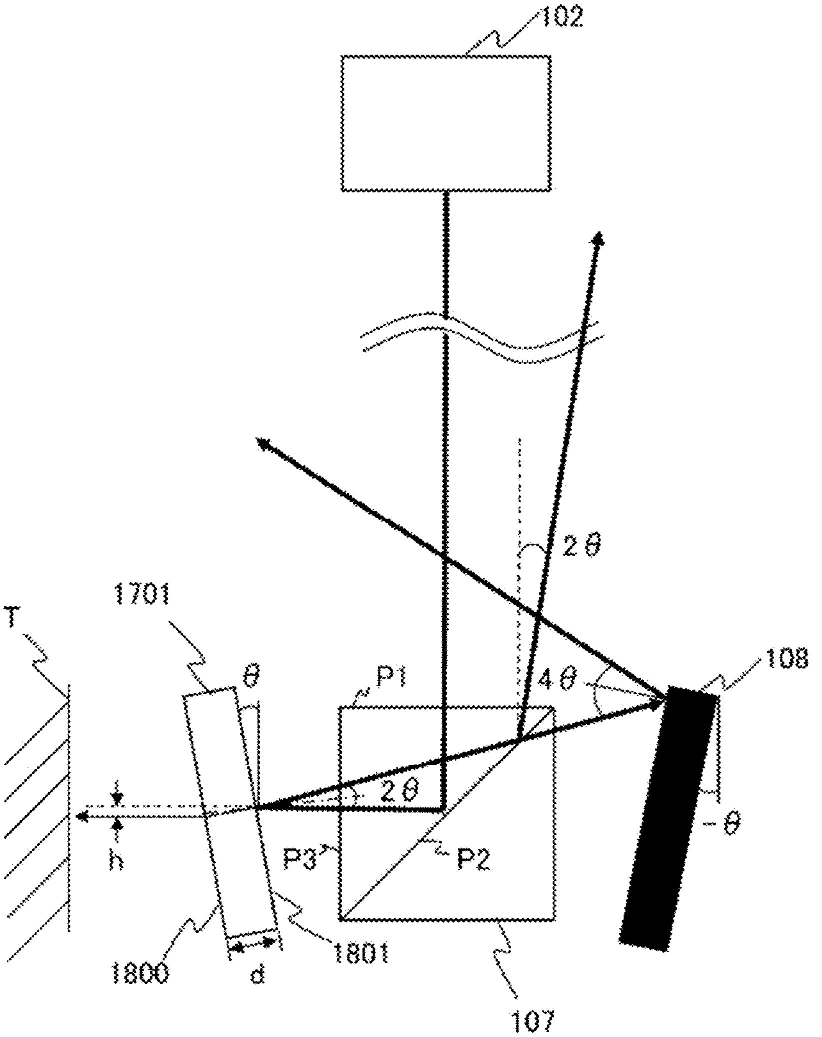

[FIG. 20]
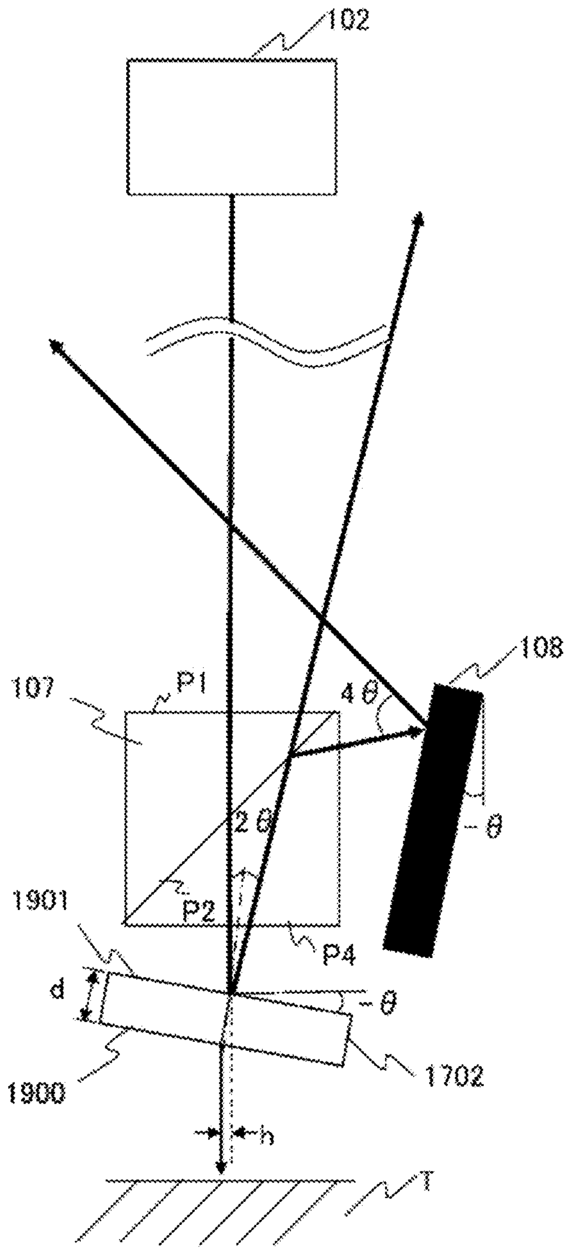

[FIG. 21]
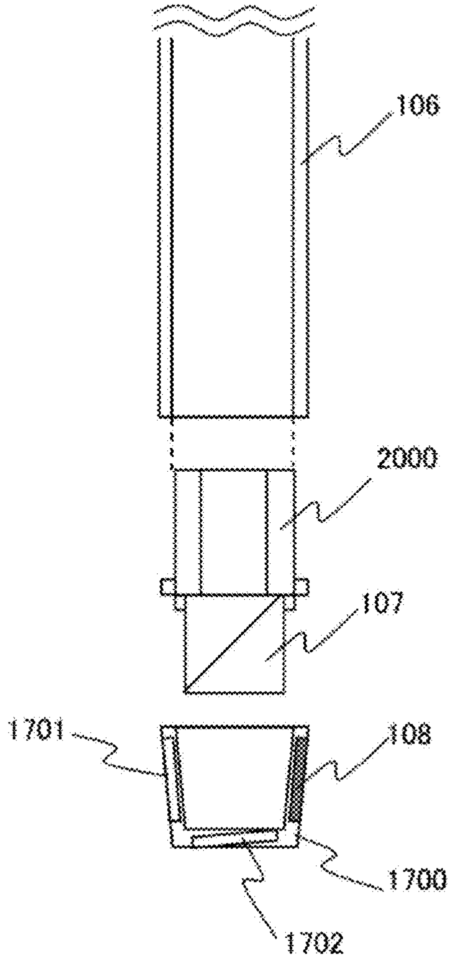

DISTANCE MEASURING DEVICE AND DISTANCE MEASURING METHOD

TECHNICAL FIELD

The present disclosure relates to a distance measuring device and a distance measuring method. The present disclosure claims priority to Japanese patent application number JP2022-121995A filed on Jul. 29, 2022, and for designated countries where incorporation by reference literature is permitted, the contents described in the application are incorporated by reference into the present application.

BACKGROUND ART

As a technique for measuring a shape of the bottom or side of a hole in a target object, for example, PTL 1 describes "a distance measuring device including a measurement probe and a probe tip end section, the measurement probe including a polarization state control section that controls polarization of measurement light emitted to the probe tip end section and a rotation mechanism that rotates the probe tip end section, the probe tip end section including an optical path switching element, the optical path switching element switching a direction of emitting the measurement light to the outside of the probe tip end section on the basis of the polarization of the measurement light and capturing light reflected or scattered by the target object".

CITATION LIST

Patent Literature

PTL 1: JP6730483B

SUMMARY OF INVENTION

Technical Problem

According to the disclosure described in PTL 1, measurement in the lateral direction and the depth direction of the measurement probe can be performed by switching the irradiation direction of the measurement light through the optical path switching element at the probe tip end section.

However, in a case where the reflected or scattered light of the measurement light by the target object is captured, the light may become stray light by reflecting inside the tip end of the probe. The stray light may cause an erroneous measurement of the distance to the target object or deterioration in measurement accuracy.

The present disclosure has been made in consideration of the above-mentioned points, and its object is to reduce stray light in the tip end of the probe and measure the distance to the target object with high accuracy.

Solution to Problem

The present application includes a plurality of means for solving at least some of the above-mentioned problems, for example, the means is as follows.

In order to solve the above-mentioned problem, there is provided a distance measuring device including a measurement probe, in which the measurement probe has a probe tip end section that is engaged with a tip end of the measurement probe, a rotating section that rotates the engaged probe tip end section, and an optical element that emits measurement light to the probe tip end section, in which at a tip end of the probe tip end section, the probe tip end section has an optical path switching element that switches an optical path of the measurement light which is incident from the optical element, in which the optical path switching element has a first surface on which the measurement light incident from the optical element is incident, a second surface that reflects or transmits the measurement light in accordance with a polarization state of the measurement light which is incident from the first surface, a third surface from which the measurement light reflected by the second surface is emitted to a target object, a fourth surface from which the measurement light passing through the second surface is emitted to the target object, and a fifth surface that faces the third surface, and in which a material of at least a part of the probe tip end section provided at a position opposite to the fifth surface absorbs the measurement light.

Advantageous Effects of Invention

According to the present disclosure, it is possible to measure the distance to the target object with high accuracy by reducing stray light in the probe tip end section.

Problems, configurations, and effects other than those described above will be clarified by the following description of the embodiments.

BRIEF DESCRIPTION OF DRAWINGS

FIG. 1 is a schematic diagram illustrating a configuration example of a distance measuring device according to a first embodiment of the present disclosure.

FIG. 2 is a diagram illustrating a configuration example of a distance measurement section.

FIG. 3 is a diagram for illustrating an example of distance calculation based on a measurement beat signal by using a frequency modulated continuous wave (FMCW) method.

FIG. 4 is a diagram for illustrating an example of distance calculation based on a measurement beat signal by using the FMCW method.

FIG. 5 is a diagram for illustrating a principle of switching an emission direction of measurement light through an optical path switching element.

FIG. 6A illustrates a case where the emission direction of the measurement light is a lateral direction, and FIG. 6B illustrates a case where the emission direction of the measurement light is a straight direction.

FIG. 7 is a diagram illustrating an example of a reflection intensity profile detected during multireflection.

FIG. 8 is a schematic diagram illustrating a configuration example of a shape measuring apparatus including the distance measuring device.

FIG. 9 is a diagram illustrating a configuration example of functional blocks of the shape measuring apparatus.

FIG. 10 is a diagram illustrating a configuration example of a distance measuring device according to a second embodiment of the present disclosure.

FIG. 11 is a diagram illustrating an example of an inclination angle of an absorbing wall in the second embodiment.

FIG. 12 is a diagram illustrating a configuration example of a distance measuring device according to a third embodiment of the present disclosure.

FIG. 13 is a diagram illustrating a configuration example of a distance measuring device according to a fourth embodiment of the present disclosure.

FIG. 14 is a diagram for illustrating a method of calculating a distance to the target object from an origin for correction.

FIG. 15 is a flow chart for illustrating an example of a shape measurement processing performed by the shape measuring apparatus.

FIG. 16 is a diagram illustrating a configuration example of a distance measuring device according to a fifth embodiment of the present disclosure.

FIG. 17 is a diagram illustrating a configuration example of a distance measuring device according to a sixth embodiment of the present disclosure.

FIG. 18 is a diagram illustrating a configuration example of a cap.

FIG. 19 is a diagram illustrating an example of a positional relationship between an absorbing wall and an optical window on a lateral side of the cap.

FIG. 20 is a diagram illustrating an example of a positional relationship between the absorbing wall and an optical window on a bottom side of the cap.

FIG. 21 is a diagram illustrating an example of a method of bonding the optical path switching element and the cap to a probe tip end section.

DESCRIPTION OF EMBODIMENTS

Figure 6A:
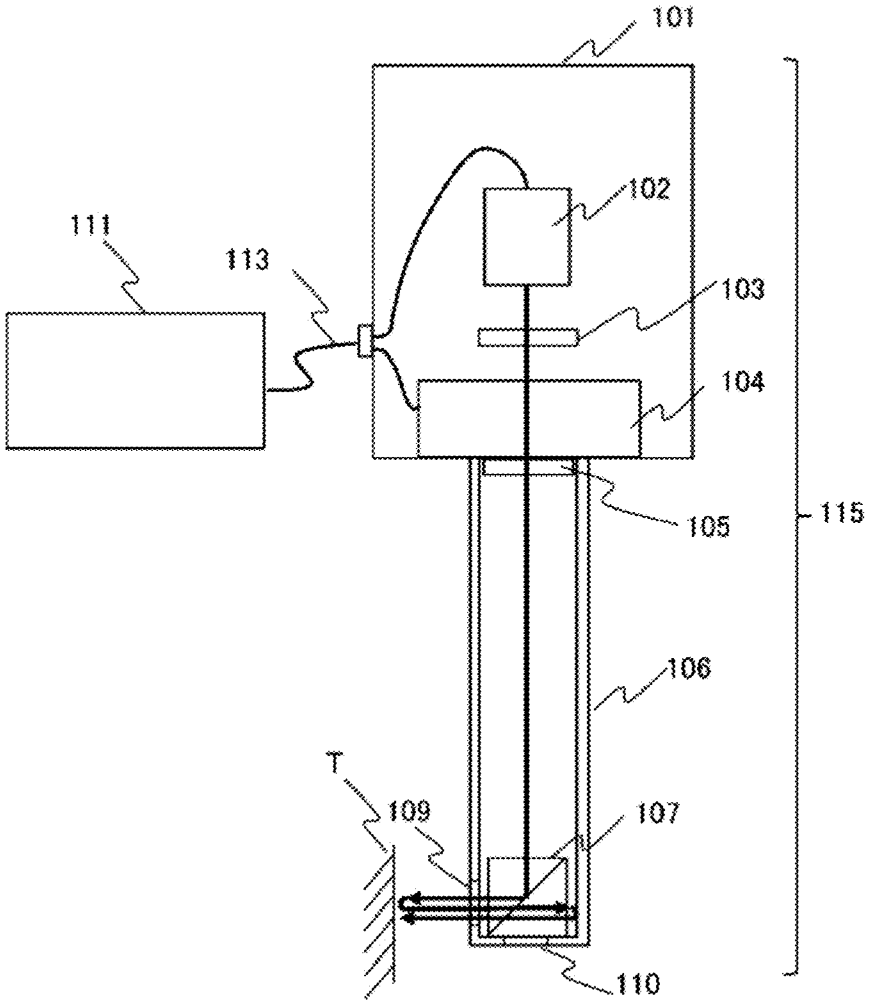
FIGS. 6A and 6B illustrate examples of stray light generated in the measurement probe, where

Hereinafter, several embodiments of the present disclosure will be described, with reference to the drawings. It should be noted that the same members in all the drawings for illustrating each embodiment are basically represented by the same reference numerals and signs, and descriptions thereof will not be repeated. Further, in the following embodiments, the components (including element steps, and the like) are not necessarily essential, except when specifically indicated and when clearly considered essential in principle. Furthermore, in a case of the term "formed of A," "made of A," "having A," or "including A," other elements are not excluded, except when it is specifically stated that there is only that element. Similarly, in the following embodiments, when referring to the shapes, positional relationships, and the like of components and the like, the shapes, positional relationships, and the like include similar and substantially similar shapes, and the like, except when specifically stated or considered to be clearly not essential in principle.

<Distance Measuring Device $100_1$ According to First Embodiment of Present Disclosure>

FIG. 1 is a schematic diagram illustrating a configuration example of a distance measuring device $100_1$ according to a first embodiment of the present disclosure.

The distance measuring device $100_1$ includes a distance measurement section 111 and a measurement probe 115.

The distance measurement section 111 generates measurement light and outputs the measurement light to the measurement probe 115 via a connection cable 113. The distance measurement section 111 calculates a distance to a target object T on the basis of the reflected light which is input from the measurement probe 115 through the connection cable 113. The connection cable 113 is formed of, for example, an optical fiber.

The measurement probe 115 is formed of a head 101 and a probe tip end section 106. The measurement probe 115 irradiates the target object T with measurement light, receives the reflected light which is reflected by the target object T, and outputs the light to the distance measurement section 111 via the connection cable 113.

The head 101 of the measurement probe 115 has a lens section 102, a first polarization state control section 103, and a rotating section 104 which are provided therein.

The lens section 102 is formed of an optical fiber focuser. The lens section 102 narrows down the measurement light which is input from the distance measurement section 111 and emits the light to a room in the head 101 toward the first polarization state control section 103. The first polarization state control section 103 is formed of, for example, a quarter-wave plate, and controls a polarization state of the measurement light. The rotating section 104 is formed of a motor and the like. The rotating section 104 rotates the motor and the like under the control of the distance measurement section 111 to rotate the probe tip end section 106 around a rotation axis parallel to the measurement light which is output from the lens section 102.

The probe tip end section 106 of the measurement probe 115 is formed in, for example, a hollow cylindrical shape such that the measurement light and the reflected light pass through the probe tip end section 106. Further, the probe tip end section 106 has an opening 109 in a first direction D1 which is the lateral direction, and an opening 110 in a second direction D2 which is a longitudinal direction. The probe tip end section 106 engages the second polarization state control section 105 on the head 101 side in the hollow cylindrical shape. Further, the probe tip end section 106 engages an optical path switching element 107 on the tip end side in the hollow cylindrical shape. The second polarization state control section 105 and the optical path switching element 107 are rotated simultaneously in accordance with rotation of the probe tip end section 106 using the rotating section 104. Since the optical path switching element 107 is provided in the probe tip end section 106, it is possible to prevent the optical path switching element 107 from being damaged by coming into contact with the target object T.

The second polarization state control section 105 is formed of, for example, a quarter-wave plate, and controls a polarization state of the measurement light.

The optical path switching element 107 is formed of, for example, a cubic polarizing beam splitter. The optical path switching element 107 reflects or transmits the measurement light, which is incident from a first surface P1, on or through a second surface P2 in accordance with a direction of linear polarization of the measurement light. Specifically, the optical path switching element 107 reflects the measurement light in the first direction D1 substantially orthogonal to the rotation axis and emits the light from a third surface P3. Further, the optical path switching element 107 also transmits the measurement light in a second direction D2 substantially parallel to a rotation axis of the probe tip end section 106, and emits the light from a fourth surface P4. A relationship between the control of the polarization state of the measurement light and an emission direction of the measurement light from the optical path switching element 107 will be described later with reference to FIG. 5.

Further, an inner wall surface of the probe tip end section 106 has an absorbing wall 108 at a position opposite to a fifth surface P5 of the optical path switching element 107. A normal line of the absorbing wall 108 is not approximately orthogonal to the rotation axis of the probe tip end section 106, but not strictly orthogonal to the rotation axis. The absorbing wall 108 is formed of, for example, a neutral density (ND) filter. The absorbing wall 108 has a higher absorption rate of light with a wavelength corresponding to the measurement light than the inner wall surface of the probe tip end section 106, and absorbs the light with the wavelength corresponding to the measurement light. It is preferable that the ND filter employed for the absorbing wall 108 is able to reduce an amount of reflected light to, for example, about 1/100,000. Instead of the ND filter, a coating of a material that absorbs light may be applied. Further, for example, a black coating such as a coating applied to an edge surface of a lens may be employed. Thereby, it is possible to prevent the accuracy of distance measurement from deteriorating by reducing the stray light in the probe tip end section 106. It should be noted that, instead of providing the absorbing wall 108, or in addition to the absorbing wall 108, the probe tip end section 106 may be formed of the material that absorbs the light with the wavelength corresponding to the measurement light. Alternatively, the probe tip end section 106 may be coated with a coating of a material that absorbs light.

It should be noted that, instead of changing the emission direction of the measurement light by controlling the polarization state of the measurement light, for example, the measurement light may be scanned using a galvanometer mirror. By using one galvanometer mirror, it is possible to scan the measurement light one-dimensionally. By using two galvanometer mirrors, it is possible to scan the measurement light two-dimensionally. Further, a micro electro mechanical systems (MEMS) mirror or a polygon mirror may be used as a mechanism for scanning the measurement light.

Next, FIG. 2 illustrates a configuration example of the distance measurement section 111. The drawing illustrates a configuration example corresponding to a case where the distance measurement section 111 employs the FMCW method of calculating the distance to the target object on the basis of the propagation time of light as the distance measurement method.

In the distance measurement section 111, a distance measurement control portion 216 transmits a sweep waveform signal to an oscillator 202. The oscillator 202 inputs a triangular wave current to a laser light source 201 to modulate a driving current. Thereby, the laser light source 201 generates frequency modulated (FM) light of which a frequency is swept over time at a constant modulation speed. It should be noted that the laser light source 201 may be configured as a semiconductor laser device equipped with an external resonator, and a resonant wavelength of the laser light source 201 may be changed in response to a triangular wave control signal from the oscillator 202. In such a case, the laser light source 201 also generates FM light of which the frequency is swept over time.

An optical fiber coupler 203 splits the generated FM light into two beams. It should be noted that the optical fiber coupler 203 may be a beam splitter. The same applies to optical fiber couplers 204, 206, and 210 to be described later.

One of the two FM light beams, which are split by the optical fiber coupler 203, is guided to a reference optical system, and is further split into two beams by the optical fiber coupler 204. One of the FM light beams, which are split into two beams by the optical fiber coupler 204, is combined with the other of the FM light beams which are split into two beams by the optical fiber coupler 206 after an optical fiber 205 provides a certain optical path difference, and is received by an optical receiver 207. The configuration is a configuration of a Mach-Zehnder interferometer. Thus, the optical receiver 207 detects a certain reference beat signal proportional to the optical path difference. The reference beat signal is output to the distance measurement control portion 216.

A polarized light switch 217 switches the other of the FM light beams, which are split into two beams by the optical fiber coupler 203, into light in a polarization direction along the slow axis or fast axis of the optical fiber. Thereafter, the FM light switched into the light in the polarization direction passes through a circulator 208 and is diverged by the optical fiber coupler 210. Then, one of the FM light beams is reflected by a reference mirror 211 to become a reference light, and the other FM light is output to the measurement probe 115 and emitted from the probe tip end section 106 to the target object T.

The reflected light, which is reflected by the target object T, returns to the probe tip end section 106, the head 101, and the distance measurement section 111 in this order, and is combined with the reference light reflected by the reference mirror 211 by the optical fiber coupler 210, and is guided to the light receiver 209 by the circulator 208. The light receiver 209 detects a measurement beat signal generated by interference between the reference light and the measurement light, and outputs the signal to the distance measurement control portion 216.

The distance measurement control portion 216 performs A/D conversion on the measurement beat signal from the light receiver 209 by using the reference beat signal from the light receiver 207 as a sampling clock. Alternatively, the reference beat signal and the measurement beat signal are sampled with a constant sampling clock. More specifically, by performing the Hilbert transform on the reference beat signal, it is possible to create a signal with a phase shifted by 90 degrees. It is possible to obtain the local phase of the signal from the reference signal before and after the Hilbert transform. Therefore, by interpolating this phase, it is possible to obtain a timing at which the reference signal has a constant phase. By performing interpolation sampling on the measurement beat signal in accordance with this timing, it is possible to re-sample the measurement beat signal with the reference beat signal which is set as a reference. Alternatively, also in a case of sampling the measurement signal using the reference beat signal as the sampling clock and performing A/D conversion on the signal by using the AD/DA conversion function of the distance measurement control portion 216, the same result can be obtained.

Further, the distance measurement control portion 216 outputs the sampled measurement beat signal to the control device 214. The control device 214 calculates a distance to the target object T from the sampled measurement beat signal. It should be noted that a method of calculating the distance based on the sampled measurement beat signal will be described later with reference to FIGS. 3 and 4.

As a modification example of the distance measurement section 111, the circulator 208, the optical fiber coupler 210, the reference mirror 211, and the light receiver 209 may be provided in the head 101 of the measurement probe 115. In such a case, the measurement bead signal, which is output by the light receiver 209, is output to the distance measurement control portion 216 through the connection cable 113.

Next, FIG. 3 is a diagram for illustrating an example of distance calculation based on the measurement beat signal by the FMCW method. The drawing illustrates a relationship between the reference light 301 which is reflected by the reference mirror 211 and the reflected light 302 which is reflected by the target object T, where the horizontal axis is the time and the vertical axis is the frequency of the measurement light.

There is a time difference $\Delta t$ between arrival times of the reference light 301 and the reflected light 302 to the light receiver 209. Then, during this time difference $\Delta t$, the frequency of the FM light from the laser light source 201 changes. Therefore, the light receiver 209 detects the measurement beat signal with a beat frequency $f_b$ equal to the frequency difference. In a case where the time required to modulate by the frequency sweep width Δν is T, the time difference Δt can be represented by the following Expression (1).

$$\Delta t = T \cdot f_b / 2\Delta v \quad (1)$$

A distance L to the target object T is ½ a distance by which the light travels during the time difference Δt. Accordingly, the distance L can be calculated by the following Expression (2) by using a light speed c in the atmosphere.

$$L = cT \cdot f_b / 2\Delta v \quad (2)$$

As can be clearly seen from Expression (2), there is a linear relationship between the distance L and the beat frequency $f_b$. Therefore, in a case where the first Fourier transform (FFT) is performed on the measurement beat signal detected by the light receiver 209 to obtain a peak position and a magnitude thereof, a reflection position and an amount of reflected light of the target object T can be obtained.

FIG. 4 is a diagram for illustrating an example of distance calculation based on the measurement beat signal by the FMCW method. The drawing illustrates an example of a reflection intensity profile, where the horizontal axis is the FFT frequency and the vertical axis is the reflection intensity.

The reflectance intensity profile is more discrete data near the peak than the rest. A peak width w is calculated on the basis of a distance resolution c/2Δν. Therefore, by applying a function such as a quadratic function or Gaussian function having a shape convex upward to data of three or more points near a peak point 401 and adopting the peak of the applied function, it is possible to determine a position of the target object T with an accuracy equal to or higher than the distance resolution.

It should be noted that although FFT has been given as an example of beat frequency analysis, for example, the maximum entropy method may also be used. In such a case, the peak position can be detected with a higher resolution than FFT.

Next, FIG. 5 is a diagram for illustrating a principle of switching the emission direction according to the polarization direction of the measurement light through the optical path switching element 107.

The optical path switching element 107 engaged with the probe tip end section 106 has a property of transmitting the measurement light in the second direction D2 in a case where the polarization direction of the measurement light oscillates in parallel with an incident plane. Further, the optical path switching element 107 has a property of reflecting the measurement light in the first direction D1 in a case where the polarization direction of the measurement light oscillates perpendicular to the incident plane.

Therefore, by turning on and off the polarized light switch 217 (FIG. 2) to electrically switch the polarization direction of the measurement light, the emission direction of the measurement light can be switched to the second direction D2 or the first direction D1. In order to rotate the emission direction of the measurement light such that the emission direction is the first direction D1, it is necessary to rotate the polarization direction of the measurement light in accordance with the rotation of the optical path switching element 107 and keep the polarization state relative to the optical path switching element 107 constant. For this reason, the first polarization state control section 103 and the second polarization state control section 105 are used.

The first polarization state control section 103 converts linearly polarized light into circularly polarized light by being provided with the axis thereof tilted by 45 degrees with respect to the polarization direction of the incident light. The second polarization state control section 105 converts the measurement light, which is converted into circularly polarized light by the first polarization state control section 103, into linearly polarized light again. It should be noted that the rotating section 104 simultaneously rotates the second polarization state control section 105 and the optical path switching element 107. Therefore, it is possible to consistently keep a polarized light incident direction constant with respect to the optical path switching element 107. As a result, it is possible to rotate the measurement light directed toward the first direction D1.

<Regarding Stray Light in Measurement Probe 115>

Here, the stray light in the measurement probe 115 will be described again. FIG. 6 illustrates a configuration example in which the absorbing wall 108 is removed from the measurement probe 115 illustrated in FIG. 1, and illustrates an example of the stray light generated in the measurement probe 115.

As illustrated in FIG. 6(A), in a case where the emission direction of the measurement light is the lateral direction, the measurement light is reflected by the target object T (first reflection), and the reflected light returns to the optical path switching element 107 in a state where the polarization is in disorder. In such a case, the polarized light component of the reflected light orthogonal to the optical path switching element 107 is reflected toward the lens section 102 in the optical path switching element 107. That is, the light travels in an opposite direction along the optical path of the measurement light. On the other hand, the polarized light component of the reflected light parallel to the optical path switching element 107 is transmitted through the optical path switching element 107, and the inner wall surface of the opposing probe tip end section 106 is irradiated with the polarized light component. The inner wall surface is directly opposite to the inner wall surface by which the irradiated light is reflected. Therefore, most of the irradiated reflected light is transmitted through the optical path switching element 107 again, and the target object T is irradiated with the light. Then, the reflected light is reflected again by the target object T (second reflection), and the reflected light returns to the optical path switching element 107 in a state where the polarization is in disorder. Then, the polarized light component of the reflected light, which is orthogonal to the optical path switching element 107, travels in the opposite direction along the optical path of the measurement light. In a case where multireflections occur in such a manner, the detected reflection intensity profile includes two components including: the component reflected the first time by the target object T and the component reflected the second time by the target object T.

Figure 6B:
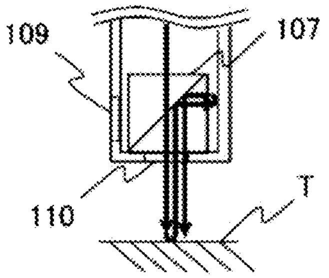

Similarly, as illustrated in FIG. 6(B), in a case where the emission direction of the measurement light is a straight direction, the measurement light is reflected by the target object T (first reflection), and the reflected light returns to the optical path switching element 107 in a state where the polarization is in disorder. In such a case, the polarized light component of the reflected light, which is parallel to the optical path switching element 107, is transmitted through the optical path switching element 107 and travels in the opposite direction along the optical path of the measurement light. On the other hand, the polarized light component of the reflected light, which is orthogonal to the optical path switching element 107, is reflected in the lateral direction by the optical path switching element 107 and the inner wall surface of the opposing probe tip end section 106 is irradiated with the polarized light component. Then, most of the reflected light with which the inner wall surface is irradiated is reflected again by the optical path switching element 107 and the target object T is irradiated with the light. Then, the reflected light is reflected again by the target object T (second reflection), and the reflected light returns to the optical path switching element 107 in a state where the polarization is in disorder. Accordingly, also in such a case, the detected reflection intensity profile includes two components including: the component reflected the first time by the target object T and the component reflected the second time by the target object T.

Next, FIG. 7 illustrates an example of a reflection intensity profile detected in a case where multireflections occur. In the drawing, the horizontal axis indicates the distance, and the vertical axis indicates the detected reflection intensity.

A distance peak 700 of the two distance peaks 700 and 701 illustrated in the drawing indicates a distance that is measured on the basis of the first reflected light from the target object T, and a distance peak 701 thereof indicates a distance that is measured on the basis of the second reflected light from the target object T. There is no problem in a case where the distance to the target object T is known in advance. However, in a case where the distance is not known, it is difficult to determine which of the distance peaks 700 and 701 indicates the distance to the target object T. Further, depending on the positional relationship of the target object T, the reflection intensity of the distance peak 701 may be greater than the reflection intensity of the distance peak 700, and the distance peak 701 may be erroneously detected as the distance to the target object T. Furthermore, in a case where the reflection intensity of the distance peak 701 is strong, the shot noise increases, and the S/N of the signal of the distance peak 700 that is originally to be measured may decrease.

In contrast, in the present embodiment, the absorbing wall 108 is provided. Therefore, the second reflection is reduced. Accordingly, it is possible to reduce the stray light in the measurement probe 115, and it is possible to prevent erroneous detection of the distance to the target object T and deterioration in measurement accuracy.

<Example of Configuration of Shape Measuring Apparatus 1000 Including Distance Measuring Device $\mathbf{100_1}$>

Next, FIG. 8 is a schematic diagram illustrating a configuration example of a shape measuring apparatus 1000 including the distance measuring device $\mathbf{100_1}$.

The shape measuring apparatus 1000 has, as a stage mechanism 903, an X-axis stage 804 that moves the placed target object T in the X direction, a Y-axis stage 805 that moves the X-axis stage 804 in the Y direction, and a Z-axis stage 806 that holds the measurement probe 115 and moves the measurement probe 115 in the Z direction. Further, the shape measuring apparatus 1000 has a stage controller 808 that controls the stage mechanism 903.

In a case of measuring a shape of the target object T, first, the target object T is placed on the X-axis stage 804, the X-axis stage 804 and the Y-axis stage 805 are moved, and the target object T is fixed at a predetermined position on the XY plane. Then, the measurement probe 115 is moved up and down using the Z-axis stage 806, and the three-dimensional shape of the target object T is measured. It should be noted that, in a case where the measurement range is narrow and the shape can be measured only through the movement in the Z-axis direction, the target object T may be positioned by a jig such that the position is uniquely determined, without using the X-axis stage 804 and the Y-axis stage 805, and the three-dimensional shape of the target object T may be measured by moving only the Z-axis stage 806.

It should be noted that the configuration example of the shape measuring apparatus 1000 is not limited to the above-mentioned example. For example, on-machine measurement on a three-axis processing machine can be realized in a case where the measurement probe 115 is held instead of the tool on the three-axis processing machine.

Further, in a case where a multi-degree-of-freedom robot holds the measuring probe 115, it is possible to realize a three-dimensional shape measuring apparatus that measures the shape of the target object T.

Next, FIG. 9 illustrates a configuration example of function blocks of the shape measuring apparatus 1000 illustrated in FIG. 8. The control device 214 has a distance calculation portion 901 and a shape calculation portion 902. The distance calculation portion 901 calculates the distance to the target object T from the sampled measurement beat signal which is input from the distance measurement section 111. Further, the distance calculation portion 901 associates the calculated distance to the target object T with a stage encoder signal for determining XYZ coordinates of the stage mechanism 903. The shape calculation portion 902 measures the three-dimensional shape of the target object T on the basis of a result of the association between the stage encoder signal and the distance to the target object T performed by the distance calculation portion 901. The display portion 215 displays the measured three-dimensional image of the target object T.

<Distance Measuring Device $\mathbf{100_2}$ According to Second Embodiment of Present Disclosure>

Next, FIG. 10 illustrates a configuration example of a distance measuring device $\mathbf{100_2}$ according to a second embodiment of the present disclosure.

The distance measuring device $\mathbf{100_2}$ is a device in which the orientation of the absorbing wall 108 in the distance measuring device $\mathbf{100_1}$ (FIG. 1) is changed. That is, the absorbing wall 108 of the distance measuring device $\mathbf{100_1}$ is provided such that the normal line to the absorbing wall 108 is substantially orthogonal (not strictly orthogonal) to the rotation axis of the probe tip end section 106. In contrast, the absorbing wall 108 of the distance measuring device $\mathbf{100_2}$ is provided such that the normal line and the rotation axis have an inclination angle θ that is greater than 0 degrees and less than 90 degrees. That is, the absorbing wall 108 of the distance measuring device $\mathbf{100_2}$ is clearly inclined as compared with the distance measuring device $\mathbf{100_1}$. It should be noted that components other than the absorbing wall 108 of the distance measuring device $\mathbf{100_2}$ are similar to the components of the distance measuring device $\mathbf{100_1}$ and are represented by the same reference numerals and signs, and therefore description thereof will not be repeated.

FIG. 11 illustrates an example of the inclination angle θ of the absorbing wall 108 in the distance measuring device $\mathbf{100_2}$.

In the distance measuring device $\mathbf{100_2}$, the measurement light, which is incident from the first surface P1 of the optical path switching element 107, is emitted in a lateral direction from the second surface P2, and is emitted from the third surface P3, is reflected by the target object T (first reflection), and the reflected light returns to the optical path switching element 107 from the third surface P3 in a state where the polarization is in disorder. Then, most of the reflected light is reflected by the second surface P2 in the direction of the lens section 102.

On the other hand, the absorbing wall 108 is irradiated with the light, which is transmitted through the second surface P2, in the reflected light. The absorbing wall 108 absorbs most of the irradiated light, but reflects a part of the irradiated light. At this time, the absorbing wall 108 is provided at an inclination angle θ with respect to the rotation axis of the probe tip end section 106. Therefore, the reflected light from the absorbing wall 108 returns to the optical path switching element 107 in a state where the reflected light is inclined at the inclination angle 2θ. Then, the reflected light is reflected again by the target object T (second reflection), and the reflected light returns to the optical path switching element 107 in a state where the polarization is in disorder. Then, most of the reflected light is reflected by the second surface P2 in the direction of the lens section 102. However, the reflected light has an inclination angle 2θ with respect to the rotation axis of the probe tip end section 106, and is thus not condensed in a case where 2θ is greater than the condensing angle of the lens section 102.

Therefore, in a case where the inclination angle θ is determined on the basis of the collection angle of the lens section 102 and the absorbing wall 108 is provided, it is possible to prevent the distance peak 701 from being caused by stray light in the reflection intensity profile (FIG. 7).

<Distance Measuring Device 100$_3$ According to Third Embodiment of Present Disclosure>

Next, a distance measuring device 100$_3$ according to a third embodiment of the present disclosure will be described. The distance measuring device 100$_3$ has a different shape of the optical path switching element 107 engaged with the probe tip end section 106 as compared with the distance measuring device 100$_1$ (FIG. 1).

FIG. 12 illustrates an example of the shape of the optical path switching element 107 engaged with the probe tip end section 106 of the configuration example of the distance measuring device 100$_3$.

The optical path switching element 107 in the distance measuring device 100$_1$ is a rectangular parallelepiped. In contrast, in the shape of the optical path switching element 107 in the distance measuring device 100$_3$, the fifth surface P5, which faces the third surface P3, is inclined by an angle θ with respect to the rotation axis of the probe tip end section 106.

In the distance measuring device 100$_3$, the measurement light, which is emitted in the lateral direction from the third surface P3 of the optical path switching element 107, is reflected by the target object T (first reflection), and the reflected light returns to the optical path switching element 107 in a state where the polarization is in disorder. Then, most of the reflected light is reflected by the second surface P2 in the direction of the lens section 102.

On the other hand, the absorbing wall 108 is irradiated with the light, which is transmitted through the second surface P2, in the reflected light from the fifth surface P5. However, the fifth surface P5 has an inclination angle θ with respect to the rotation axis of the probe tip end section 106. Thus, the light emitted from the fifth surface P5 is refracted by each e' represented by the following Expression (3).

$$\theta' = \sin^{-1}(n \cdot \sin\theta) \quad (3)$$

Here, n is a refractive index of the optical path switching element 107.

The absorbing wall 108 absorbs most of the light from the fifth surface P5, but a part of the light is reflected. At this time, the light from the fifth surface P5 is inclined by the angle θ, and the reflected light from the absorbing wall 108 is inclined by the inclination angle 2θ and returns to the optical path switching element 107. Then, the reflected light is reflected again by the target object T (second reflection), and the reflected light returns to the optical path switching element 107 in a state where the polarization is in disorder. Then, most of the reflected light is reflected by the second surface P2 in the direction of the lens section 102. However, the reflected light has an inclination angle 2θ with respect to the rotation axis of the probe tip end section 106, and is thus not condensed in a case where 2θ is greater than the condensing angle of the lens section 102.

Therefore, in a case where the inclination angle θ of the fifth surface P5 of the optical path switching element 107 is determined on the basis of the collection angle of the lens section 102, it is possible to prevent the distance peak 701 from being caused by stray light in the reflection intensity profile (FIG. 7).

<Distance Measuring Device 100$_4$ According to Fourth Embodiment of Present Disclosure>

Next, FIG. 13 illustrates a configuration example of a distance measuring device 100$_4$ according to a fourth embodiment of the present disclosure.

In the distance measuring device 100$_4$, a reflective coating 1300, which reflects a part of the measurement light from the lens section 102, is applied to the first surface P1 of the optical path switching element 107. Further, AR coatings 1301 and 1302 that prevent reflection are provided on the third surface P3 in the lateral direction of the optical path switching element 107 and the fourth surface P4 in the straight direction of the optical path switching element 107.

In the distance measuring device 100$_4$, the reflective coating 1300 is provided on the first surface P1 of the optical path switching element 107. Thereby, the first surface P1 can be used as the origin for correction in distance measurement. Thereby, it is possible to neglect a distance measurement error caused by a change in the optical path length due to the effects of heat and the like in the optical path behind the optical fiber coupler 210. Further, the AR coatings 1301 and 1302 are provided on the third surface P3 and fourth surface P4 of the optical path switching element 107. Therefore, the stray light inside the optical path switching element 107, which causes noise, can be suppressed.

FIG. 14 is a diagram for illustrating a method of correction for the distance measurement using the origin for correction, corresponding to the distance measuring device 100$_4$ (FIG. 13), and illustrates an FFT result of the detection beat signal obtained from the distance measuring device 100$_4$. The horizontal axis in the drawing indicates the distance, and the vertical axis indicates the detection intensity of the detection beat signal.

The distance based on the reflected light, which is reflected on the first surface P1 of the optical path switching element 107 as the origin for correction, is detected as a detection peak 1401. On the other hand, the distance based on the reflected light, which passes through the first surface P1 of the optical path switching element 107 and is emitted from the third surface P3 or the fourth surface P4 and with which the target object T is irradiated, is detected as a detection peak 1402. Therefore, by subtracting the distance represented by the detection peak 1401 from the distance represented by the detection peak 1402, it is possible to obtain the distance to the target object T from the first surface P1 of the optical path switching element 107 which is the origin for correction.

Next, FIG. 15 is a flowchart for illustrating an example of distance measurement processing performed by the shape measuring apparatus 100 including the distance measuring device $\mathbf{100}_4$.

The distance measurement processing is started in response to, for example, a predetermined start operation from a user. First, the control device 214 determines whether the distance measurement for the target object T (for example, a hole) is a lateral side measurement in which the measurement light is emitted in the first direction D1, or a depth measurement in which the measurement light is emitted in the second direction D2, on the basis of the operation which is input from the user (step S1).

In a case where it is determined in step S1 that the distance measurement is a lateral side measurement, the control device 214 controls the distance measurement section 111 to control the emission direction of the measurement light from the measurement probe 115 to the first direction D1, emits the measurement light, and rotates the probe tip end section 106 by the rotating section 104. Then, the distance calculation portion 901 of the control device 214 acquires the measurement beat signal which is sampled from the distance measurement section 111. In synchronization with the signal, the distance calculation portion 901 acquires the stage encoder signal for determining the XYZ coordinates of the stage mechanism 903 and the rotation angle of the rotating section 104 from the stage controller 808, and associates the stage encoder signal and the rotation angle (step S2).

Next, as described with reference to FIG. 14, the distance calculation portion 901 calculates each of the distance to the target object T from the predetermined origin and the distance to the origin for correction (the first surface P1 of the optical path switching element 107) from the predetermined origin, on the basis of the measurement beat signal (step S3). Next, the distance calculation portion 901 calculates the distance to the target object T from the origin for correction by subtracting the distance to the origin for correction from the predetermined origin from the distance to the target object T from the predetermined origin (step S4).

Next, the shape calculation portion 902 calculates the diameter of the target object T (hole), on the basis of the results of the association between the rotation angle of the rotating section 104 and the stage encoder signal and the association between the rotation angle of the rotating section 104 and the distance to the target object T from the origin for correction obtained by the distance calculation portion 901 (step S5). At this time, it is also possible to calculate the circularity of the target object T (hole).

On the other hand, in a case where it is determined in step S1 that the distance measurement is a depth measurement, the control device 214 controls the distance measurement section 111 and controls the emission direction of the measurement light from the measurement probe 115 to the second direction D2, emitting the measurement light. Then, the distance calculation portion 901 of the control device 214 acquires the measurement beat signal which is sampled from the distance measurement section 111. In synchronization with the signal, the distance calculation portion 901 acquires the stage encoder signal for determining the XYZ coordinates of the stage mechanism 903 from the stage controller 808, and associates the two signals (step S6).

Next, similarly to step S3, the distance calculation portion 901 calculates each of the distance to the target object T from the predetermined origin and the distance to the origin for correction from the predetermined origin (the first surface P1 of the optical path switching element 107), on the basis of the measurement beat signal (step S7). Subsequently, similarly to step S4, the distance calculation portion 901 calculates the distance to the target object T from the origin for correction, that is, the depth by subtracting the distance to the origin for correction from the predetermined origin from the distance to the target object T from the predetermined origin (step S8). It should be noted that the three-dimensional shape of the target object T may be measured on the basis of the calculation results of steps S5 and S8. Then, the distance measurement processing ends.

<Distance Measuring Device $\mathbf{100}_5$ According to Fifth Embodiment of Present Disclosure>

Next, FIG. 16 illustrates a configuration example of a distance measuring device $\mathbf{100}_5$ according to a fifth embodiment of the present disclosure.

The distance measuring device $\mathbf{100}_5$ differs from the distance measuring device $\mathbf{100}_1$ (FIG. 1) in the position of the optical path switching element 107. The optical path switching element 107 of the distance measuring device $\mathbf{100}_1$ is engaged with the inside of the tip end side of the probe tip end section 106. In contrast, the optical path switching element 107 of the distance measuring device $\mathbf{100}_5$ is exposed to the outside of the opening on the tip end side of the probe tip end section 106.

Thereby, it is easy to clean the optical path switching element 107 in a case where the optical path switching element 107 becomes dirty due to dust and the like. It should be noted that AR coatings 1301 and 1302 may be provided on the third surface P3 and the fourth surface P4 of the optical path switching element 107, similarly to the distance measuring device $\mathbf{100}_4$ (FIG. 13). With such a configuration, it is possible to prevent the stray light in the optical path switching element 107, which causes noise. Further, a water-repellent coating may be provided on the third surface P3 and the fourth surface P4. In such a manner, it is possible to prevent the optical path switching element 107 from becoming dirty.

<Distance Measuring Device $\mathbf{100}_6$ According to Sixth Embodiment of Present Disclosure>

Next, FIG. 17 illustrates a configuration example of a distance measuring device $\mathbf{100}_6$ according to a sixth embodiment of the present disclosure.

The distance measuring device $\mathbf{100}_6$ is configured with adding a cap 1700 that covers the exposed optical path switching element 107 to the distance measuring device $\mathbf{100}_5$ (FIG. 16).

FIG. 18 illustrates a configuration example of the cap 1700. The cap 1700 has a first optical window 1701, a second optical window 1702, and an absorbing wall 108. The first optical window 1701 is provided at an inclination angle greater than 0 degrees and less than 90 degrees between the third surface P3 of the optical path switching element 107 and the target object T such that the normal line of the first optical window 1701 is not orthogonal to the rotation axis of the probe tip end section 106. The second optical window 1702 is provided at an inclination angle greater than 0 degrees and less than 90 degrees between the fourth surface P4 of the optical path switching element 107 and the target object T such that the normal line of the second optical window 1702 is not parallel to the rotation axis of the probe tip end section 106. The absorbing wall 108 is provided at a position opposite to the fifth surface P5 of the optical path switching element 107.

It is preferable to provide an AR coating and a water-repellent coating on an outer side surface 1800 (FIG. 8) of the first optical window 1701. It is also preferable to provide an AR coating on an inner side surface 1801 (FIG. 8) of the first optical window 1701. Further, it is desirable to chamfer the outer side corners of the cap 1700. By chamfering the corners, the measurement probe 115 can be prevented from being damaged due to the shift of the measurement probe 115 in a case where the cap 1700 comes into contact with the target object T.

FIG. 19 illustrates an example of a positional relationship between the first optical window 1701 on the lateral side of the cap 1700 and the absorbing wall 108.

The inclination angle θ of the first optical window 1701 will be described. A part of the measurement light, of which irradiation is performed in the lateral direction from the third surface P3 of the optical path switching element 107, is reflected by the surface of the first optical window 1701. In a case where the first optical window 1701 is made of glass, a reflectance of the first optical window 1701 is 4%. In such a case, although the reflectance depends on the sensitivity of the light receiver 209, the reflectance is excessively large, and the light receiver 209 is likely to be saturated. Therefore, the first optical window 1701 is inclined by the angle θ with respect to the rotation axis of the probe tip end section 106. The light, which is reflected by the first optical window 1701, returns to the second surface P2 in a state where the light is inclined by an angle 2θ, and is reflected to be inclined at an angle of 2θ with respect to the rotation axis of the probe tip end section 106. Accordingly, in a case where the angle 2θ is greater than the condensing angle of the lens section 102, the reflected light at the first optical window 1701 is not condensed by the lens section 102. Therefore, the inclination angle θ can be determined on the basis of the condensing angle of the lens section 102.

It should be noted that the optical axis of the measurement light, of which irradiation is performed in the lateral direction from the third surface P3 of the optical path switching element 107 and passes through the first optical window 1701, shifts due to the inclination θ and thickness d of the first optical window 1701 in a case where the measurement light passes through the first optical window 1701. An amount of optical axis shift h is represented by the following Expression (4).

$$d = h \cdot \sin\theta \left(1 - \cos\theta / \sqrt{(n2 - \sin2\theta)}\right) \tag{4}$$

For example, in a case where the thickness d of the first optical window 1701 is 200 μm and the angle θ is 2 degrees, the amount of optical axis shift h is about 4 μm. Although the amount of optical axis shift h depends on the beam diameter of the irradiated measurement light, in a case where the beam diameter of the measurement light is about 100 μm, for example, the amount of optical axis shift of about 4 μm does not have an effect on the distance measurement and can be neglected.

Next, a relationship between the inclination angle θ of the first optical window 1701 and the absorbing wall 108 will be described. The inclination angle of the absorbing wall 108 is inclined only in the direction of −θ, relative to the inclination angle θ of the first optical window 1701. The light, which is reflected by the first optical window 1701 and incident on the absorbing wall 108 at an angle 2θ, is inclined by 4θ when reflected by the absorbing wall 108. Therefore, it is possible to suppress the light condensing performed by the lens section 102.

FIG. 20 illustrates an example of a positional relationship between the second optical window 1702 on the bottom side of the cap 1700 and the absorbing wall 108.

First, the inclination angle θ of the second optical window 1702 will be described. A part of the measurement light, of which irradiation is performed in the straight direction from the fourth surface P4 of the optical path switching element 107, is reflected by the surface of the second optical window 1702. In a case where the second optical window 1702 is made of glass, a reflectance of the second optical window 1702 is 4%. In such a case, although the reflectance depends on the sensitivity of the light receiver 209, the reflectance is excessively large, and the light receiver 209 is likely to be saturated. Therefore, the second optical window 1702 is inclined by the angle θ with respect to a line orthogonal to the rotation axis of the probe tip end section 106. The light, which is reflected by the second optical window 1702, passes through the second surface P2 while being inclined by the angle 2θ. Accordingly, in a case where the angle 2θ is greater than the condensing angle of the lens section 102, the light, which is reflected by the second optical window 1702, is not condensed. Therefore, the inclination angle θ can be determined on the basis of the condensing angle of the lens section 102.

It should be noted that there is an amount of optical axis shift of the measurement light, of which irradiation is performed in the straight direction from the fourth surface P4 of the optical path switching element 107 and which passes through the second optical window 1702, similarly to the first optical window 1701 described above. However, in a case where the amount of optical axis shift h is about 4 μm, the amount of optical axis shift h can be neglected because the amount does not have an effect on the distance measurement.

Next, a relationship between the inclination angle θ of the second optical window 1702 and the absorbing wall 108 will be described. Similarly to the case of the first optical window 1701, the light, which is reflected by the second optical window 1702 and incident on the absorbing wall 108 at the angle 2θ, is inclined by 4θ when reflected by the absorbing wall 108. Therefore, it is possible to suppress the light condensing performed by the lens section 102.

Next, FIG. 21 illustrates an example of a method of bonding the optical path switching element 107 and the cap 1700 to the probe tip end section 106 in the distance measuring device $100_6$(FIG. 17).

As shown in the drawing, first, the optical path switching element 107 is bonded to the holder 2000. Next, the holder 2000 is inserted into and bonded to the probe tip end section 106. Finally, the cap 1700 is bonded to the holder 2000. In such a manner, by combining the optical path switching element 107 and the cap 1700 with the probe tip end section 106, the optical path switching element 107 and the cap 1700 having the first optical window 1701, the second optical window 1702, and the absorbing wall 108 can be provided with high accuracy.

The present disclosure is not limited to the above-mentioned embodiment, and can be modified into various forms. For example, the above-mentioned embodiments have been described in detail to make the disclosure easier to understand, and are not necessarily limited to those having all of the configurations described. Further, it is possible to replace a part of a configuration of one embodiment with a configuration of another embodiment, or to add the part to the configuration.

Some of or the entirety of the above-mentioned configurations, functions, processing sections, processing means, and the like may be obtained as hardware, for example, by designing those as integrated circuits. Further, the above-mentioned configurations, functions, and the like may be obtained as software by a processor interpreting and executing a program that obtains each function. Information such as a program, table, or file that obtains each function can be placed in a recording apparatus such as a memory, a hard disk, or an SSD or a recording medium such as an IC card, an SD card, or a DVD. Further, the control lines and information lines indicate that those are considered necessary for the explanation, and do not necessarily indicate all the control lines and information lines in the product. In practice, it can be considered that most of all the configurations are connected to one another.

REFERENCE SIGNS LIST

$100_1$ to $100_6$: shape measuring apparatus
101: head
102: lens section
103: first polarization state control section
104: rotating section
105: second polarization state control section
106: probe tip end section
107: optical path switching element
108: absorbing wall
109, 110: opening
111: distance measurement section
113: connection cable
115: measurement probe
808: stage controller
901: distance calculation portion
902: shape calculation portion
903: stage mechanism
1000: shape measuring apparatus
1300: reflective coating
1301: AR coating
1302: AR coating
1700: cap
1701: first optical window
1702: second optical window
2000: holder

The invention claimed is:

1. A distance measuring device comprising a measurement probe,
wherein the measurement probe has
a probe tip end section that is engaged with a tip end of the measurement probe,
a rotating section that rotates the engaged probe tip end section, and
an optical element that emits measurement light to the probe tip end section, wherein at a tip end of the probe tip end section, the probe tip end section has
an optical path switching element that switches an optical path of the measurement light which is incident from the optical element,
wherein the optical path switching element has
a first surface on which the measurement light incident from the optical element is incident,
a second surface that reflects or transmits the measurement light in accordance with a polarization state of the measurement light which is incident from the first surface,
a third surface from which the measurement light reflected by the second surface is emitted to a target object,
a fourth surface from which the measurement light passing through the second surface is emitted to the target object, and
a fifth surface that faces the third surface, and
wherein a material of at least a part of the probe tip end section provided at a position opposite to the fifth surface absorbs the measurement light,
wherein the probe tip end section has an absorbing wall that absorbs the measurement light, at the tip end of the probe tip end section, and
wherein the absorbing wall
has a higher absorption rate of the measurement light than the material of the part of the probe tip end section provided at the position opposite to the fifth surface, and
is provided at the position opposite to the fifth surface of the optical path switching element, and
wherein an angle between a normal line to the absorbing wall and a rotation axis of the probe tip end section is less than 90 degrees.

2. The distance measuring device according to claim 1,
wherein the first surface of the optical path switching element is provided with a reflective coating that reflects a part of the measurement light incident from the optical element, and is set as an origin for correction in distance measurement.

3. The distance measuring device according to claim 1,
wherein a distance measurement section calculates a distance to the target object, and
wherein the distance measurement section calculates the distance to the target object on the basis of a propagation time of light which is calculated on the basis of reflected light from the target object.

4. The distance measuring device according to claim 1,
wherein the fifth surface of the optical path switching element is inclined at a predetermined angle with respect to a rotation axis of the probe tip end section.

5. A distance measuring device comprising a measurement probe,
wherein the measurement probe has
a probe tip end section that is engaged with a tip end of the measurement probe,
a rotating section that rotates the engaged probe tip end section, and
an optical element that emits measurement light to the probe tip end section,
wherein at a tip end of the probe tip end section, the probe tip end section has
an optical path switching element that switches an optical path of the measurement light which is incident from the optical element,
wherein the optical path switching element has
a first surface on which the measurement light incident from the optical element is incident,
a second surface that reflects or transmits the measurement light in accordance with a polarization state of the measurement light which is incident from the first surface, a third surface from which the measurement light reflected by the second surface is emitted to a target object, a fourth surface from which the measurement light passing through the second surface is emitted to the target object, and a fifth surface that faces the third surface, and wherein a material of at least a part of the probe tip end section provided at a position opposite to the fifth surface absorbs the measurement light, wherein the probe tip end section has a first optical window through which the measurement light emitted from the third surface of the optical path switching element is transmitted and from which the measurement light is emitted to the target object, and a second optical window through which the measurement light emitted from the fourth surface of the optical path switching element is transmitted and from which the measurement light is emitted to the target object, wherein an angle between a normal line to the first optical window and a rotation axis of the probe tip end section is less than 90 degrees, and wherein an angle between a normal line to the second optical window and the rotation axis of the probe tip end section is equal to or greater than 0 degrees.

6. The distance measuring device according to claim 5, wherein the measurement probe has a cap that covers the optical path switching element engaged with the tip end of the probe tip end section, and wherein the first optical window, the second optical window, and the absorbing wall are provided in the cap.

7. A distance measuring device comprising a measurement probe, wherein the measurement probe has a probe tip end section that is engaged with a tip end of the measurement probe, a rotating section that rotates the engaged probe tip end section, and an optical element that emits measurement light to the probe tip end section, wherein at a tip end of the probe tip end section, the probe tip end section has an optical path switching element that switches an optical path of the measurement light which is incident from the optical element, wherein the optical path switching element has a first surface on which the measurement light incident from the optical element is incident, a second surface that reflects or transmits the measurement light in accordance with a polarization state of the measurement light which is incident from the first surface, a third surface from which the measurement light reflected by the second surface is emitted to a target object, a fourth surface from which the measurement light passing through the second surface is emitted to the target object, and a fifth surface that faces the third surface, and wherein a material of at least a part of the probe tip end section provided at a position opposite to the fifth surface absorbs the measurement light, wherein the absorbing wall is formed of an ND filter or a paint that absorbs the measurement light.

8. A distance measurement method using a distance measuring device including a distance measurement section and a measurement probe, wherein the measurement probe has a probe tip end section that is engaged with a tip end of the measurement probe, a rotating section that rotates the engaged probe tip end portion, and an optical element that emits measurement light to the probe tip end section, wherein at a tip end of the probe tip end section, the probe tip end section has an optical path switching element that switches an optical path of the measurement light which is incident from the optical element, wherein the optical path switching element has a first surface on which the measurement light incident from the optical element is incident, a second surface that reflects or transmits the measurement light in accordance with a polarization state of the measurement light which is incident from the first surface, a third surface from which the measurement light reflected by the second surface is emitted to a target object, a fourth surface from which the measurement light passing through the second surface is emitted to the target object, and a fifth surface that faces the third surface, and wherein a material of at least a part of the probe tip end section provided at a position opposite to the fifth surface absorbs the measurement light, and wherein the distance measurement method comprises:

switching an optical path of the measurement light incident from the optical element toward the third surface, through the optical path switching element;

scanning the measurement light emitted from the third surface to the target object while rotating the probe tip end section, through the rotating section; and calculating the distance to the target object on the basis of reflected light from the target object, through the distance measurement section, wherein the probe tip end section has an absorbing wall that absorbs the measurement light, at the tip end of the probe tip end section, and wherein the absorbing wall has a higher absorption rate of the measurement light than the material of the part of the probe tip end section provided at the position opposite to the fifth surface, and is provided at the position opposite to the fifth surface of the optical path switching element, and wherein an angle between a normal line to the absorbing wall and a rotation axis of the probe tip end section is less than 90 degrees.

* * * * *